No. 669,544. Patented Mar. 12, 1901.
F. R. McBERTY.
APPARATUS FOR PARTY TELEPHONE LINES.
(Application filed May 21, 1898.)
(No Model.)
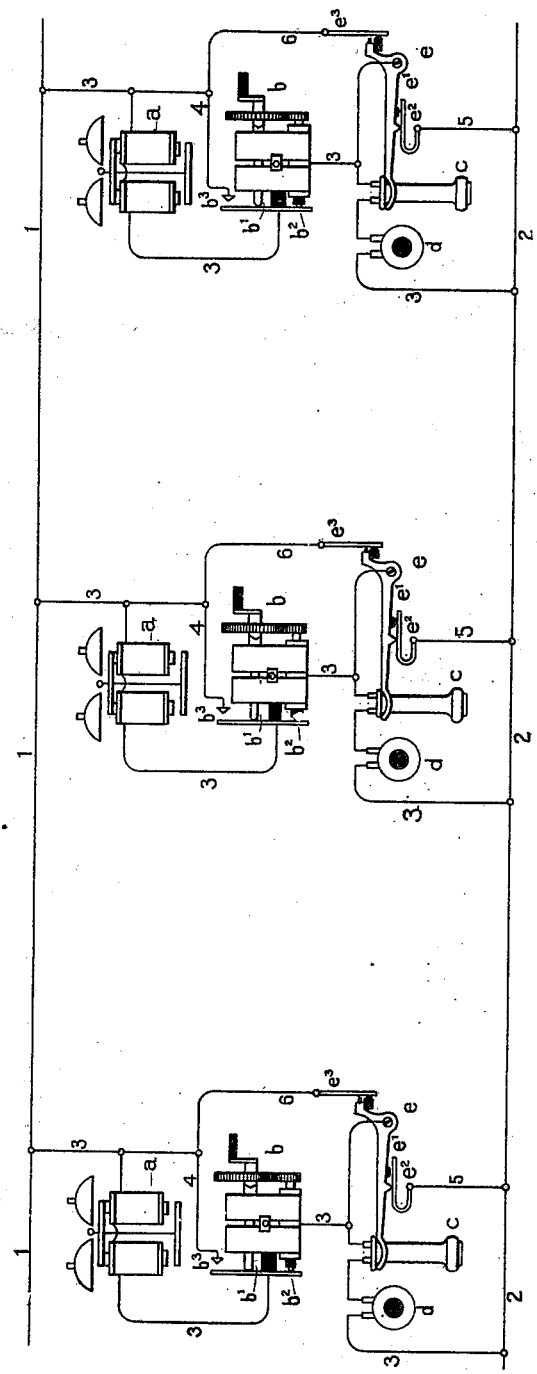
Witnesses:
Inventor,
Frank R. McBerty
By Barton Brown
Attorneys.

UNITED STATES PATENT OFFICE.

FRANK R. McBERTY, OF DOWNERS GROVE, ILLINOIS, ASSIGNOR TO THE WESTERN ELECTRIC COMPANY, OF CHICAGO, ILLINOIS.

APPARATUS FOR PARTY TELEPHONE-LINES.

SPECIFICATION forming part of Letters Patent No. 669,544, dated March 12, 1901.

Application filed May 21, 1898. Serial No. 681,299. (No model.)

*To all whom it may concern:*

Be it known that I, FRANK R. MCBERTY, a citizen of the United States, residing at Downers Grove, in the county of Dupage and State of Illinois, have invented a certain new and useful Improvement in Apparatus for Party Telephone-Lines, (Case No. 65,) of which the following is a full, clear, concise, and exact description.

This invention relates to the signaling and telephonic appliances and the circuit connections thereof for substations of multiple station or party telephone lines, the object of the invention being to avoid the loss or obstruction occasioned by some appliances of current designed to operate other appliances simultaneously connected with the line at the same station, which characterizes the apparatus heretofore provided for use at such stations.

The invention consists in the combination, with the line conductors forming a through line, of a bridge of the line at each substation, telephones, a generator of signaling current, and a call-bell of high impedance serially connected in the bridge, a normally open short circuit of the bell and generator, a normally closed short circuit of the telephones, and a telephone-switch adapted to complete the first-mentioned short circuit and to break the second-mentioned short circuit about the telephone while the telephone is in use, a normally closed short circuit of the generator, a normally open short circuit of the bell, and a circuit-closer actuated in the operation of the generator adapted to open the shunt about the generator and to close the short circuit of the bell.

It will be apparent that in the normal condition of this apparatus the high-impedance bell is alone operative in the bridge at each substation, the remaining appliances in the bridge being short-circuited. In transmitting a call signal the short circuit of the generator is broken and a short circuit of the bell is closed, so that the terminals of the generator are, in effect, applied directly to the line conductors. When the telephone is in use, the generator and bell are both short-circuited, so that the telephones alone remain in the closed bridge of the circuit.

The invention is illustrated in the accompanying drawing. This represents apparatus at three substations connected in bridges of a metallic party-line circuit.

The line conductors 1 and 2 are, as usual, continuous metallic conductors. A bridge 3 of the line-circuit is formed at each substation. In this bridge are interposed serially a polarized call-bell $a$, a generator $b$ of signaling-current, a receiving-telephone $c$, together with the secondary winding of an induction-coil whose primary winding is, as usual, in a local circuit with the transmitting-telephone $d$. The bell, generator, and telephones may be of the usual and well-known type. The bell $a$ should be characterized by high resistance and impedance. The generator $b$ is provided with an automatically-operated switch comprising a part $b'$, adapted to be retracted automatically in the operation of the generator, a spring $b^2$, normally bearing on this extension of the driving-shaft, and a contact-anvil $b^3$, upon which the spring $b^2$ is adapted to rest when relieved of the outward pressure of the shaft $b'$. The substantial features of such an automatically operative switch are found in Patent No. 309,617 to E. Gray, of December 23, 1884. One terminal of the armature of the generator is connected with the spring $b^2$, while the other is connected with the frame of the generator. The receiving-telephone $c$ rests on the hook of the usual telephone-switch $e$. This switch may be of the type described in Patent No. 425,058, of April 8, 1890, to E. P. Warner. It consists of a lever $e'$ with a contact-spring $e^2$, with which it normally makes connection, the weight of the telephone being supported on the hook, and a spring $e^3$, with which it makes contact when the telephone is removed from the hook. The parts $b'$ $b^2$ of the automatic switch of the generator control in the usual way a short circuit of the coil of the generator. This shunt is closed at all times when the generator is not in use. The contacts $b^2$ $b^3$ control a shunt 4 about the call-bell $a$, which becomes closed when the generator is brought into operation. The telephone-switch $e$ normally closes a shunt-conductor 5 about the telephone $c$ and the secondary winding of the induction-coil of transmitter $d$, being adapted to break this shunt when the switch-lever rises. The lever $e'$ and the spring $e^3$ coöperate when the lever rises to close a short circuit 6 about the bell $a$ and preferably also about the generator $b$. Thus while the apparatus is in its normal condition a bridge exists at each station which may be traced by way of wire 3 to contact-spring $b^2$, thence to the frame of the generator, thence to the lever $e'$ of switch $e$, and thence by wire 5 to the line conductor 2. All these bridges at the different stations are of high impedance and the bells therein are in multiple on the line, so that a generator-current impressed on the line will ring all the bells; but at the same time the self-induction of the bells prevents the shunting of telephonic current at intermediate stations when two stations are transmitting telephonic currents.

When the generator $b$ is operated, the shunt about the generator is automatically broken and the shunt 4 is closed about the bell $a$, so that the terminals of the generator are, in effect, applied directly to the line conductors 1 and 2 by way of wires 4 and 5, respectively, with no intermediate resistance in the bridge. Thus the generator is capable of operating a large number of bells in multiple up to the capacity of the line.

When the telephone $c$ is brought into use, the switch-lever in rising breaks the normal shunt 5 about the telephones and closes a direct circuit between the telephones and the line conductor 1, so that at such time the telephones alone are in the bridge of the line-circuit. Thus while making use of a single bridge of the line-circuit I am enabled to place all the necessary appliances in this bridge and to eliminate from this bridge at any time the resistance of all those which are not in use at that time.

I claim as my invention—

The combination in a telephone-line with the line conductors thereof, of a bridge of the line, a call-bell, a generator, and a telephone, serially connected in the said bridge, a normally closed short circuit of the telephone, and a telephone-switch adapted to open the said short circuit, a normally closed short circuit of the bell, said telephone-switch being adapted to close said short circuit while the telephone is in use, a normally closed short circuit of the generator, an automatic switch on the generator adapted to break said short circuit of the generator in the use of the generator, and a normally open short circuit of the bell, said switch of the generator being adapted to complete said short circuit of the bell in the use of the generator, substantially as described.

In witness whereof I hereunto subscribe my name this 18th day of April, A. D. 1898.

FRANK R. McBERTY.

Witnesses:
ELLA EDLER,
DUNCAN E. WILLETT.